United States Patent
Thorsell

(12) 
(10) Patent No.: US 7,231,974 B2
(45) Date of Patent: Jun. 19, 2007

(54) SELF-LEAVING IN-SITU DEVICE AND METHOD FOR PASSIVELY REMOVING OIL FROM WATER WELLS

(75) Inventor: G. Scott Thorsell, Anchorage, AK (US)

(73) Assignee: Chevron U.S.A., San Ramon, CA (US)

( * ) Notice: Subject to any disclaimer, the term of this patent is extended or adjusted under 35 U.S.C. 154(b) by 280 days.

(21) Appl. No.: 11/102,158

(22) Filed: Apr. 8, 2005

(65) Prior Publication Data
US 2006/0225883 A1     Oct. 12, 2006

(51) Int. Cl.
*E21B 43/00*     (2006.01)
*C02F 1/28*      (2006.01)

(52) U.S. Cl. .................... 166/265; 210/691
(58) Field of Classification Search .............. None
See application file for complete search history.

(56) References Cited

U.S. PATENT DOCUMENTS

| | | | | |
|---|---|---|---|---|
| 3,774,685 A | 11/1973 | Rhodes | | 166/314 |
| 5,252,000 A | 10/1993 | Mohs | | 405/53 |
| 5,484,023 A * | 1/1996 | Shippee | | 166/369 |
| 5,577,558 A * | 11/1996 | Abdul et al. | | 166/246 |
| 5,794,698 A | 8/1998 | Roberts | | 166/265 |
| 6,041,863 A | 3/2000 | Lindsey | | 166/311 |
| 6,365,214 B1 * | 4/2002 | Kirk | | 426/330.6 |
| 6,367,563 B1 | 4/2002 | Looney et al. | | 175/20 |

OTHER PUBLICATIONS

"Sorbrite™" Oil Absorbent Kit, Supplies & Services Environmental Catalogue, Enviro Products Inc., 2003, p. 6.

* cited by examiner

*Primary Examiner*—Frank Tsay
(74) *Attorney, Agent, or Firm*—Steven L. Christian; Yale S. Finkle

(57) ABSTRACT

A simple and inexpensive device with no moving arts for removing from a well non-aqueous liquids, such as gasoline or crude oil, that accumulate on top of the water table in the well comprises a buoyant elongated member, such as a plastic tube sealed at both ends, and a hydrophobic sorbtive material preferably attached to the outside of the tube. The buoyant device is lowered into the well where it floats either in the non-aqueous liquids or in the water such that the sorbtive material is in contact with and absorbs the non-aqueous liquids from the surface of the water. The buoyant device is then removed from the well, the spent sorbtive material replaced with fresh sorbtive material and the device again lowered into the well for further removal of non-aqueous liquids.

23 Claims, 2 Drawing Sheets

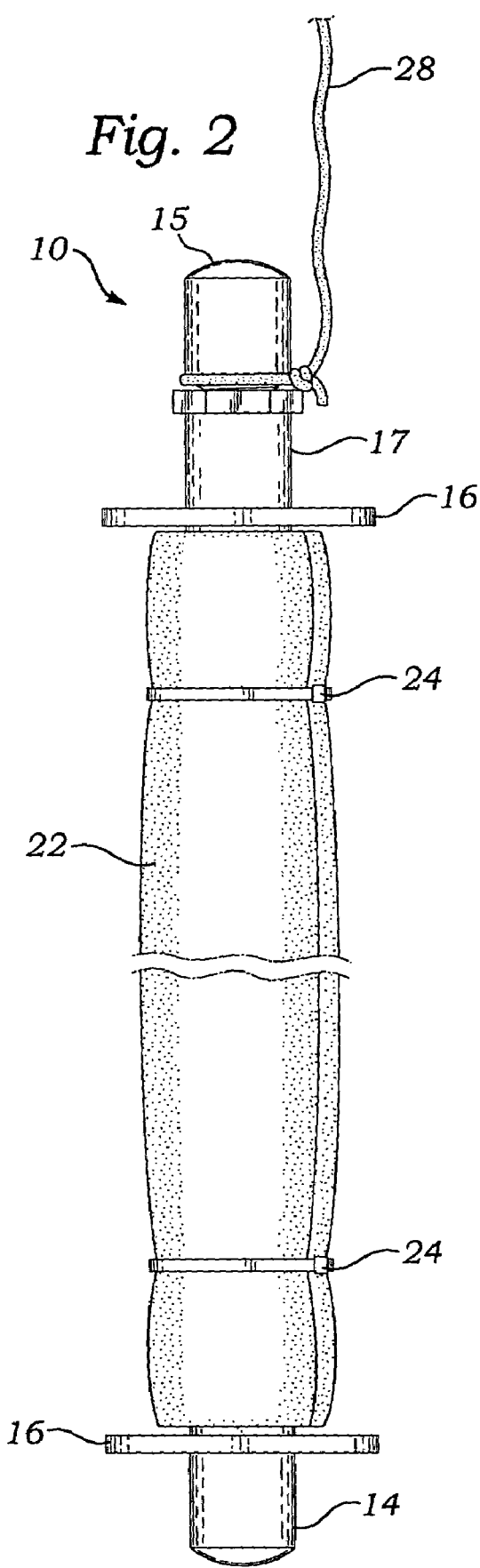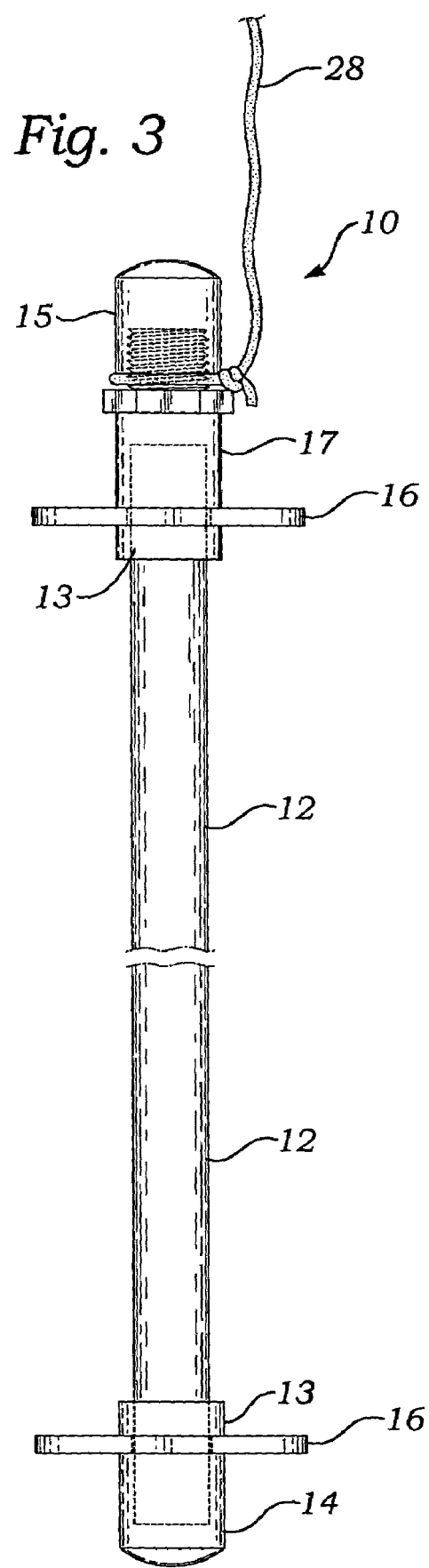

SELF-LEAVING IN-SITU DEVICE AND METHOD FOR PASSIVELY REMOVING OIL FROM WATER WELLS

BACKGROUND OF INVENTION

This invention relates to a device and method for removing from a well light non-aqueous liquids that float on the surface of water in the well, and is particularly concerned with a simple inexpensive device having no moving parts that can passively remove crude oil and other hydrocarbons from groundwater wells.

It is not uncommon for light hydrocarbons, such as crude oil, gasoline and other distillate products, to escape into the environment from oil producing fields, service stations, refineries, natural gas processing plants and other related petroleum processing facilities. Quite frequently these light hydrocarbons work themselves into the soil where they migrate downwardly and end up collecting on the surface of the water table. These hydrocarbons float on the water surface, spread across the water in the direction of least resistance and partially dissolve into the water causing significant pollution. Thus, most state and local governments have laws and regulations requiring the removal of these hydrocarbons from groundwater wells. As an example, the state of Alaska requires the removal of crude oil and other non-aqueous liquids from groundwater monitoring or observation wells in the Swanson River oil and gas field. This requirement applies to even very small amounts of non-aqueous liquids found in these monitoring wells.

Although there are established methods for removing and recovering light non-aqueous liquids such as hydrocarbons from water wells, these methods normally involve the use of relatively complicated downwell devices having moving parts to remove and recover rather large amounts of liquids or the use of expensive surface equipment to pull vacuums in the wells. Such devices and equipment tend to be either somewhat complicated and expensive or difficult to use. Thus, there exists a need for a relatively simple device without moving parts that is inexpensive to fabricate and can be easily used to passively remove relatively small amounts of hydrocarbons and other light non-aqueous liquids from the surface of water in monitoring and other wells.

SUMMARY OF THE INVENTION

In accordance with the invention, it has now been found that a relatively simple buoyant device comprising an elongated member, such as a tube or rod, and a hydrophobic material having sorbtive capacity for non-aqueous liquids can be lowered into a well to remove the non-aqueous liquids floating on the surface of water in the well. The buoyant device is sufficiently heavy to sink into the floating non-aqueous liquids and is capable of floating in these liquids and in the water. Thus, if the layer of non-aqueous liquids is sufficiently deep or thick, the buoyant device will float in these liquids. However, if the layer of non-aqueous liquids is rather shallow or thin, the buoyant device will sink through the liquids and float in the water such that a portion of the buoyant device extends above the surface of the water and into the non-aqueous liquids. The hydrophobic material, which is preferably attached to the outside surface of the buoyant device, sorbs the non-aqueous liquids from the water's surface as it repels the water. Once the hydrophobic material is saturated with the non-aqueous liquids, the buoyant device is lifted out of the well, the spent hydrophobic sorbtive material is removed from the elongated member and replaced with fresh sorbtive material, and the device is again lowered into the well to remove additional non-aqueous liquids. The spent hydrophobic sorbtive material containing the non-aqueous liquids is then disposed of in accordance with environmental regulations.

In a preferred embodiment the buoyant device comprises a piece of plastic pipe or tube sealed at both ends with the hydrophobic sorbtive material wrapped around the tube. The device is lowered into the well and dropped into the liquids where it is self-leveling, i.e., where it either floats in the layer of non-aqueous liquids or in the water such that at least a portion of the hydrophobic sorbtive material is sitting in the floating layer of non-aqueous liquids. Because the device floats and is therefore self-leveling, it is not necessary to suspend or hang it into the well from outside the well while guessing where it should be positioned axially inside the well so it sits in the layer of non-aqueous liquids, whose level in the well is constantly changing with the level of the groundwater. Since the device is easy to fabricate from readily available materials and has no moving parts, its manufacture and use is an inexpensive way to comply with environmental regulations that require removing non-aqueous liquid pollutants from groundwater wells.

BRIEF DESCRIPTION OF THE DRAWINGS

FIG. 2 is a side elevation view of the apparatus of the invention depicted in the well of FIG. 1; and FIG. 3 is a side elevation view of the apparatus of the invention without its hydrophobic sorbtive material attached.

All identical reference numerals in the figures of the drawings refer to the same or similar elements or features.

DETAILED DESCRIPTION OF THE INVENTION

Figure 1:
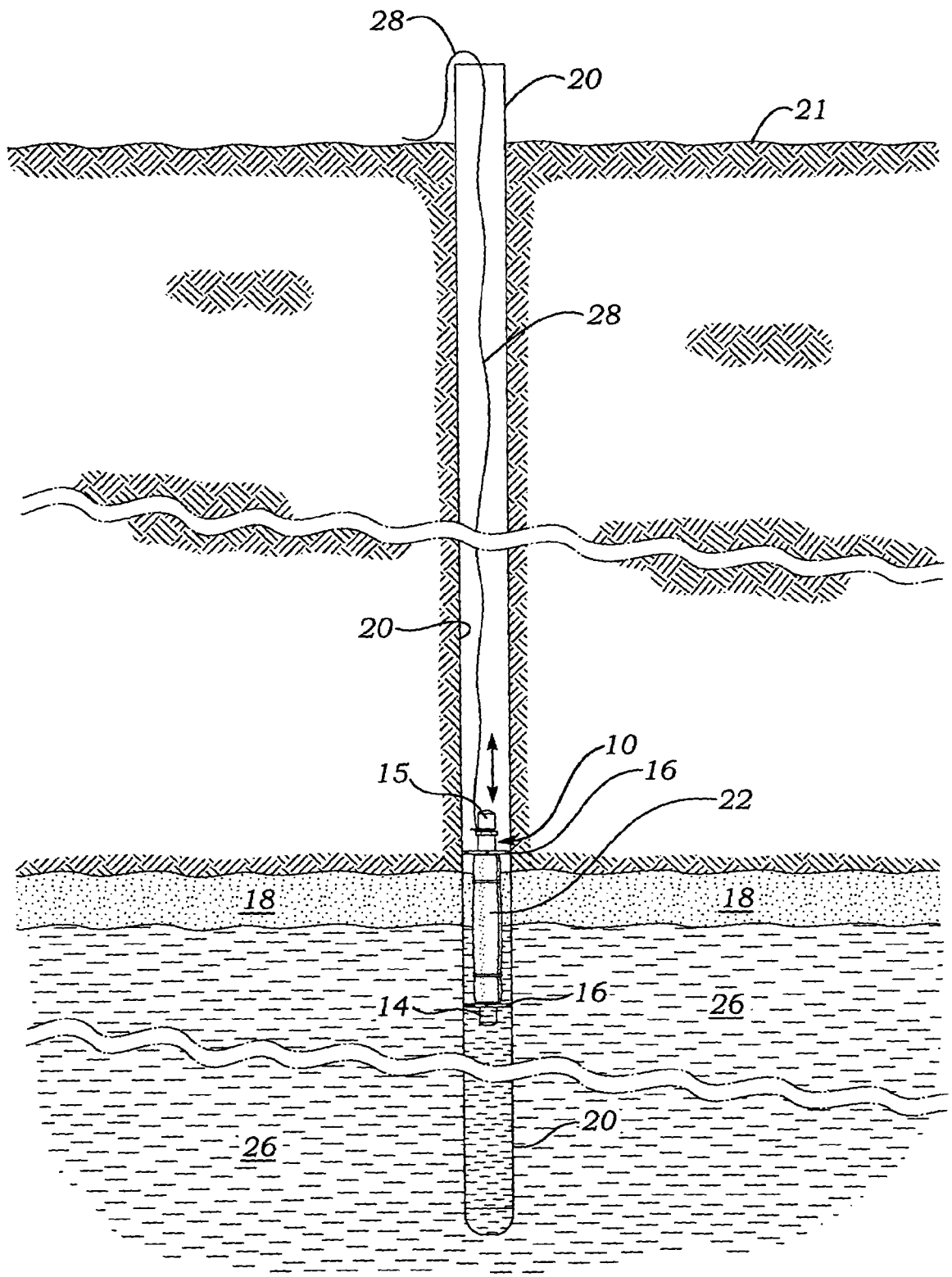
FIG. 1 of the drawings is a cross sectional elevation view of a groundwater monitoring well in which the apparatus of the invention is used to remove non-aqueous liquids from the well.

FIGS. 1–3 in the drawings illustrate one embodiment of the non-inflatable buoyant oil removal device 10 of the invention and its use for removing non-aqueous liquids 18, such as hydrocarbons, from a monitoring well 20, which extends from the ground surface 21 into the groundwater 26. The monitoring well may be fairly shallow extending into the ground between 20 and 30 feet or much deeper, for example, up to as much as about 100 feet. The layer of non-aqueous liquid 18 floating on the surface of the water can vary in thickness from less than about 1 inch to as much as 25 feet. Typically, the thickness of the layer of non-aqueous liquids ranges from about 0.01 to about 6 feet.

As seen in FIGS. 2 and 3, the oil removal device 10 comprises a hollow tube 12, upper and lower retaining rings 13, coupler 17, upper end cap 15, lower end cap 14, centralizers 16 and hydrophobic sorptive pad 22, which is wrapped around tube 12 and secured thereto with plastic or metal ties 24. A bailing line 28 for lowering the oil removal device 10 into and retrieving it from the well 20 is attached to the device in a groove near the top of the device.

The tube 12 shown in FIG. 3 serves as the central stem of the buoyant oil removal device 10. It is typically made of a section of non-perforated plastic pipe, such as PVC pipe used in irrigation systems. In order to ensure that the oil removal device is buoyant, the interior of the pipe 12 is normally empty of any liquid or solid materials and the pipe is sealed at its bottom with a plastic cap 14 that is glued or cemented onto the bottom of the tube 12. Although it is not absolutely necessary, the top of the tube 12 is normally also sealed, preferably with a threaded plastic cap 15. Unlike its counterpart cap 14, this cap is screwed onto the male portion of coupler 17, whose female end is glued or cemented onto the top of tube 12. This arrangement creates a groove near the top of the buoyant device 10 into which the bailing line 28 can be secured. Although it is preferred that the tube 12 be made from a piece of plastic pipe that is sealed at the bottom to create buoyancy, pipes made of other materials, such as aluminum or other light metal, can also be used as long as the oil removal device is buoyant and capable of floating in the non-aqueous liquids 18 and groundwater 26 in well 20.

As can be seen in FIG. 2, a pad 22 of sorbtive material is wrapped around tube 12 and secured to the tube with ties 24. The ties are cinched tight enough to prevent the pads from unraveling or sliding off the tube 12. The pad can be made of any hydrophobic material that readily absorbs non-aqueous liquids, such as hydrocarbons, and repels water. Typically, the pads are made from a hydrophobic polypropylene fibrous material. An example of one type of sorbtive pad that can be used is Model MRO 15DP manufactured by Sorbent Products company. These pads come in rolls measuring 15 inches in width and 150 feet long with double perforations every 9 inches. Of course, the actual size of the sorbtive pads utilized depends on the length of the tube 12 used as the stem of the buoyant removal device.

The centralizers 16 shown in FIGS. 2 and 3 are used to keep the buoyant oil removal device 10 centered inside well 20 so that the outside surface of pad 22 does not contact the walls of the well 20 and is therefore directly exposed to the non-aqueous liquids 18 floating on the groundwater 26. The centralizers, which are in the shape of a washer, are usually cut from sheets of plastic, Plexiglas or Teflon so they have an outside diameter somewhat smaller than that of the inside diameter of well 20. A hole slightly larger than that of the outside diameter of tube 12 is drilled into the cutouts so that the centralizers can be slipped over the bottom and top of tube 12 and secured on the tube between the lower retaining ring 13 and the end cap 14 and the upper retaining ring 13 and the coupler 17, respectively. The retaining rings 13 are typically between 0.25 and 0.75 inch in length and have an inside diameter that allows them to be slipped over tube 12 and cemented in place near the top and bottom of the tube. The retaining rings are typically made by cutting into sections a plastic coupler having an inside diameter slightly larger than the outside diameter of tube 12.

Bailing line 28 is tied or otherwise secured around the buoyant device 10 in the groove formed by end cap 15 when screwed onto coupler 17. The bailing line is used to lower the device 10 into the well 20 and, after the pad 22 has absorbed the non-aqueous liquids, to remove the device from the well. The bailing line can be made of nylon, wire or other material with the requisite strength to lift and lower the buoyant device 10. Normally, the line is only between about 0.013 and 0.125 inch in diameter.

Typically, the oil removal device 10 is used in a groundwater monitoring well having an inside diameter between about 2 and 6 inches. In such cases the buoyant device 10 usually has an outside diameter between about 1.5 and 5 inches. Typically the length of the buoyant device ranges from about 10 inches to about 36 inches.

For a 2 inch monitoring well, the tube 12 of the device is about 12 to 18 inches in length with an outside diameter of about 0.5 inch and the centralizers 16 have an outside diameter of 1.5 to 1.625 inches. If the buoyant device is made from plastic, it will usually be quite light weighing only between about 0.2 and about 1.5 pounds.

The buoyant device 10 can be used to remove from wells any type of non-aqueous liquid pollutants that are lighter than water and therefore accumulate on the surface of water in the well. Examples of such liquids include any type of organic liquids lighter than water including crude oil and refined hydrocarbons such as gasoline, fuel oil, kerosene, jet fuel and the like.

The use of device 10 to remove non-aqueous liquids from a well is illustrated in FIG. 1. The figure shows a monitoring well 20 extending between about 20 to 30 feet downward from the ground surface 21 into groundwater 26. The well is lined with plastic pipe, not shown in the drawing, having an inside diameter of 2 to 6 inches. The buoyant oil removal device 10 is lowered into the well using bailing line 28. If the layer of non-aqueous liquids is thick enough, the device 10 will float in these liquids. If, on the other hand, the thickness of the non-aqueous liquids is relatively thin, the device 10 will settle through these liquids and float in the water so that at least a portion of the device extends upward into the floating layer of non-aqueous liquid. Thus, it is not necessary to accurately position the device in the well or to support it from outside the well. Once the device is lowered into the well, it will float in either the layer of non-aqueous liquids or in the water such that sorbtive pad 22 extends into the non-aqueous liquids. Because the bailing line is not needed to support the device 10 in the well, it can be retained outside the well such that it lay slack on the ground.

Once the buoyant device 10 is lowered into well 20, centralizers 16 not only keep the device centered in the well such that sorbtive pad 22 is in direct contact with the non-aqueous liquids 18, but also help to keep the pad from sliding off the device. The sorbtive pad simultaneously repels the water in the well as it absorbs the non-aqueous liquids. Once the pad is saturated with the non-aqueous liquids, the device 10 is lifted out of the well with bailing line 28, the ties 24 are removed, and the saturated or spent sorbtive pad 22 is unwrapped from around tube 12 and replaced with a fresh pad. The device 10 is then lowered back into the well to remove additional non-aqueous liquids. The spent pad containing the non-aqueous liquids is then disposed of in accordance with environmental regulations. For example, when device 10 is used to remove crude oil from monitoring wells in an oil field, the spent pads can be combined with other crude oil wastes that are collected in drums and shipped to licensed disposal facilities for incineration or other disposal.

In the embodiment of the invention described above, the buoyant device 10 is comprised of a non-perforated plastic tube with hydrophobic sorbtive material wrapped around it and secured with plastic ties. It will be understood that the apparatus of the invention is not so limited. For example, the sorbtive material could be secured to the outside of tube 12 with metal wire or rubber O-rings and the tube could be made of a material other than plastic. Moreover, the tube could be perforated and the sorbtive material placed inside the tube. Also, a solid rod could be used in lieu of the tube as long as the resultant oil removal device is buoyant and therefore capable of floating in the non-aqueous liquids and the water. Of course, in this embodiment, the hydrophobic sorbtive material would be attached to the outside of the rod.

Although this invention has been described by reference to several embodiments and to the figures in the drawing, it is evident that many alterations, modifications and variations will be apparent to those skilled in the art in light of the foregoing description. Accordingly, it is intended to embrace within the invention all such alternatives, modifications and variations that fall within the spirit and scope of the appended claims.

I claim:

1. A process for removing non-aqueous liquids floating on the surface of water in a well comprising:
   (a) placing in said well a buoyant device comprising an elongated member and a hydrophobic material having sorbtive capacity for said non-aqueous liquids, wherein said buoyant device is sufficiently heavy to sink into said floating non-aqueous liquids and capable of floating in said water such that a portion of said buoyant device extends above the surface of said water into said non-aqueous liquids; and
   (b) removing said buoyant device from said well after said hydrophobic material has sorbed at least a portion of said non-aqueous liquids.

2. The process defined by claim 1 wherein said hydrophobic material is attached to the outside surface of said elongated member and said elongated member is devoid of perforations.

3. The process defined by claim 2 wherein said elongated member comprises a tube.

4. The process defined by claim 2 wherein said elongated member comprises a rod.

5. The process defined by claim 1 wherein said elongated member is made of plastic.

6. The process defined by claim 3 wherein said tube comprises a piece of PVC pipe.

7. The process defined by claim 6 wherein said buoyant device comprises said PVC pipe sealed at both ends with PVC caps.

8. The process defined by claim 2 wherein said sorbtive material comprises polypropylene.

9. The process defined by claim 1 wherein said well is a monitoring well.

10. The process defined by claim 9 wherein said well has an inside diameter between about 2 inches and about 6 inches and said buoyant device has an outside diameter between about 1.5 inch and about 5 inches.

11. The process defined by claim 10 wherein said buoyant device is between about 10 and about 36 inches in length.

12. The process defined by claim 1 wherein said buoyant device is not inflatable.

13. The process defined by claim 1 wherein said non-aqueous liquids comprise hydrocarbons.

14. The process defined by claim 1 wherein said buoyant device is not supported in said well from outside said well.

15. A buoyant device for removing non-aqueous liquids from the surface of water in a well comprising:
   (a) an elongated member; and
   (b) a hydrophobic material having sorbtive capacity for said non-aqueous liquids, wherein said buoyant device is sufficiently heavy to sink into said floating non-aqueous liquids and capable of floating in said water such that a portion of said buoyant device extends above the surface of said water and into said non-aqueous liquids.

16. The buoyant device defined by claim 15 wherein said elongated member comprises a tube devoid of perforations.

17. The buoyant device defined by claim 15 wherein said elongated member comprises a rod.

18. The buoyant device defined by claim 16 wherein said hydrophobic material is attached to the outside surface of said tube.

19. The buoyant device defined by claim 18 wherein said tube is sealed at both ends.

20. The buoyant device defined by claim 19 further comprising a plurality of solid rings in the shape of a washer having a hole in the center larger than the outside diameter of said tube wherein at least one of said rings is attached around said buoyant device near its top and at least one of said rings is attached around said buoyant device near its bottom.

21. The buoyant device defined by claim 16 wherein the inside of said tube is devoid of liquids and solids.

22. The buoyant device defined by claim 19 consisting essentially of said sealed tube and said hydrophobic material.

23. The buoyant device defined by claim 22 wherein said hydrophobic material is wrapped around said sealed tube.

* * * * *